United States Patent

McBride

[15] 3,685,430

[45] Aug. 22, 1972

[54] SOY BEAN PROCESSING MACHINE

[72] Inventor: John A. McBride, 4760 N.W. 50th St., Des Moines, Iowa 50323

[22] Filed: Oct. 28, 1970

[21] Appl. No.: 84,730

[52] U.S. Cl. ..................99/235 R, 100/148, 259/10
[51] Int. Cl. ............................................A23k 1/14
[58] Field of Search......................99/235, 237–238; 18/12, 16; 100/DIG. 3, DIG. 8, DIG. 10, 43, 148; 198/64; 259/9–10, 25–26, 45–46

[56] References Cited

UNITED STATES PATENTS

| | | | |
|---|---|---|---|
| 1,527,911 | 2/1925 | Patti | 100/148 |
| 1,762,368 | 6/1930 | Vandergrift | 100/93 S X |
| 2,060,408 | 11/1936 | Wood | 99/237 R |
| 2,340,009 | 1/1944 | Meakin | 100/43 |
| 2,793,582 | 5/1957 | Rothe et al. | 99/235 R X |
| 2,915,957 | 12/1959 | Bowman | 99/238 PD |
| 3,062,657 | 11/1962 | Vollink | 99/238 PD UX |
| 3,140,652 | 7/1964 | Williams | 100/148 |
| 3,164,375 | 1/1965 | Frenkel | 259/9 X |
| 3,316,830 | 5/1967 | Biehl | 99/235 R |
| 3,391,778 | 7/1968 | Lasiter | 198/64 |

*Primary Examiner*—Robert W. Jenkins
*Assistant Examiner*—Arthur O. Henderson
*Attorney*—Zarley, McKee & Thomte

[57] ABSTRACT

A processing machine for soy beans or other like material comprising a variable speed auger means which feeds soy beans into a hopper positioned above and in communication with an elongated barrel type housing. A screw conveyor means is rotatably mounted in the housing and has one end thereof operatively connected to power means for rotation thereof. A spiral flighting means extends from the conveyor means towards the housing for conveying the soy beans along the length of the housing from its intake end to its discharge end. A fluting means is provided on the interior surface of the housing and extends towards the screw conveyor means. A frustum-shaped end plate is secured to the discharge end of the screw conveyor means for rotation therewith. A ring-shaped end member is secured to the discharge end of the housing and has a central opening formed therein with a progressively increasing diameter. The frustum-shaped end member is rotatably received within the central opening. A bearing means is provided at the intake end of the conveyor means and is threadably mounted in the intake end of the housing to permit the selective longitudinal movement of the conveyor means with respect to the housing. The selective longitudinal movement of the bearing means causes the longitudinal movement of the conveyor means which permits the clearance between the frustum-shaped end member and the ring-shaped end member to be varied. A brake means is provided on the machine adapted to engage the bearing means to maintain it in its selected positions with respect to the housing. A temperature sensing means is also provided on the housing for sensing the temperature of the material at the discharge end thereof. The soy beans are crushed and conveyed by the conveyor means and are forced outwardly from the housing between the frustum-shaped end member and the ring-shaped member. The soy beans are crushed, heated and cooked by heat and pressure applied thereto as the same travels through the housing and passes outwardly therefrom.

11 Claims, 6 Drawing Figures

PATENTED AUG 22 1972　3,685,430
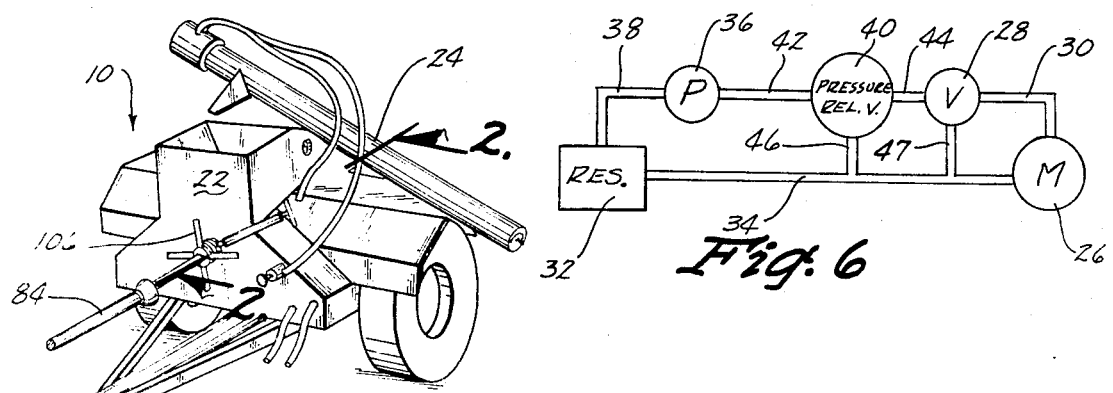
INVENTOR
JOHN A. McBRIDE
BY
Zarley, McKee & Thomte
ATTORNEYS

SOY BEAN PROCESSING MACHINE

Soy beams are not suitable for animal feed until they have been cooked to neutralize the urease activity therein. Attempts have been made to cook the soy beans prior to their use as animal feeds but the previous methods have met with little success due to the inefficiency of the methods and the relatively high cost of preparing the soy beans. The machine disclosed in the co-pending application represented a distinct advancement in the art and the invention of the instant application represents an improvement over applicant's earlier machine.

Therefore, it is a principal object of this invention to provide a processing machine for soy beans or the like.

A further object of this invention is to provide a soy bean processing machine which is efficient in operation.

A further object of this invention is to provide a soy bean processing machine which is economical of manufacture and economically processes the soy beans.

A further object of this invention is to provide a soy bean processing machine which heats and cooks the soy beans as the soy bean material is passed through a main screw conveyor housing.

A further object of this invention is to provide a soy bean processing machine which may be easily cleaned.

A further object of this invention is to provide a soy bean processing machine which will not become clogged.

A further object of this invention is to provide a soy bean processing machine which is durable in use.

A further object of this invention is to provide a soy bean processing machine having convenient adjustment means thereon for permitting the selective adjustment of the screw conveyor means with respect to the housing.

A further object of this invention is to provide a soy bean processing machine having a temperature sensing means provided thereon.

A further object of this invention is to provide a soy bean processing machine having a variable speed intake auger means associated therewith.

A further object of this invention is to provide a soy bean processing machine which may be easily disassembled.

These and other object will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front perspective view of the machine of this invention.

FIG. 2 is a partial sectional view of the main screw conveyor housing and the screw conveyor means therein as seen on lines 2—2 of FIG. 1.

FIG. 3 is an enlarged partial sectional view as seen along lines 3—3 of FIG. 2.

FIG. 4 is a partial end elevational view of one form of the screw conveyor means.

FIG. 5 is a view similar to FIG. 4 but which illustrates a modified form of the screw conveyor means.

FIG. 6 is a schematic view of the hydraulic circuitry for the input auger means.

The machine of this invention is generally designated by the reference numeral 10 comprising generally a wheeled frame means 12 having a main screw conveyor housing 14 extending longitudinally thereon. Housing 14 has an intake end 16 and and a discharge end 18. Housing 14 has an intake opening 20 formed therein which is in communication with a hopper 22. Hopper 22 is adapted to receive soy beans or other like material therein from a variable speed input auger 24. Auger 24 is driven by a hydraulic motor 26 at the upper end thereof. Motor 26 is connected to a control valve 28 by a hose 30. Motor 26 is connected to the hydraulic fluid reservoir 32 on the tractor or the like by a hose 34. A tractor or the like is normally used to pull the machine 10 and the hydraulic system of the tractor is used to drive the motor 26. Reservoir 32 is connected to a pump 36 on the tractor by conduit 38. Pump 36 is connected to a pressure relief valve 40 by conduit 42. Relief valve 40 is connected to the valve 28 by conduit 44 and is connected to the hose 34 by a conduit 46. Valve 28 is connected to hose 34 by conduit 47.

The speed of the auger 24 may be varied by simply manually operating the valve 28 so as to control the amount of fluid being supplied to the motor 26. When valve 28 is closed, the hydraulic fluid is recirculated to the reservoir 32 by means of conduit 46 and hose 34. When valve 28 is opened, fluid is supplied to the motor 26 to drive the auger 24. The conduit 47 permits fluid to return to reservoir 32 when the motor 26 isn't being operated at maximum speed.

A temperature indicating meter 48 is provided on the machine 10 so as to be easily visible to the operator. Meter 48 is mechanically connected to a sensing means 50 provided on the housing 14 adjacent the discharge end thereof for sensing the temperature of the material in the housing just prior to the material being discharged therefrom.

Housing 14 is provided with a plurality of elongated flutes 52 or the like which extend inwardly from the interior surface of the housing. Housing 14 is provided with an internally threaded portion 54 which has the hub portion 56 of a bearing means 58 threadably received therein. As seen in FIG. 3, hub portion 56 is threadably received by the internally threaded portion 54 and has a smooth outer end surface 60 provided thereon. Bearing means 58 includes a bearing inner housing 62 which embraces cylindrical portion 64 of shaft 66 which extends through the housing 14. The inner end of housing 62 engages shoulder 68 on shaft 66 as illustrated in FIG. 3. Tapered roller bearings 69 and 70 are positioned between hub portion 56 and housing 62 and are spaced by means of a snap ring assembly 71 as seen in FIG. 3. The inner end of bearing 70 engages shoulder 72 on housing 62. Seal 73 embraces the inner end of housing 62 to prevent material from entering the interior of the bearing means. A bearing pre-load nut 74 is threadably mounted on the outer end of housing 62 to permit the amount of load imposed in the bearings to be selectively varied. Seal 76 embraces the pre-load nut 74 as seen in FIG. 3 to prevent foreign material from entering the interior of the bearing means 58. Nut 78 is threadably mounted on shaft 66 and provides a means for removing the shaft 66 from the machine and to permit the removal of the complete bearing means 58. The removal of nut 78 permits the bearing means 58 to be easily removed from the machine without the components thereof completely falling apart. Shaft 66 is suitably connected to the tractor power-take-off shaft 84 to permit the rotation thereof.

Shaft 66 is provided with a cylindrical portion 86 which extends from the intake end to the discharge end thereof. Spiral flighting 88 extends from the cylindrical portion 86 for conveying the material along the length of the interior of the housing 14. A frustum shaped base plate 89 is welded to the discharge end of the cylindrical portion 86 and has a frustum shaped end plate 90 secured thereto by a plurality of bolts 92 in the manner seen in FIG. 2. A ring 94 extends around the discharge end of the housing 14 and is secured thereto by welding or the like as illustrated in FIG. 3. A ring-shaped member 96 is secured to the ring 94 in the manner illustrated in FIG. 3 by a plurality of bolts 98 extending therethrough. Member 96 is provided with a central opening formed therein having an increasing diameter from the inner end to outer end thereof thereby defining a tapered surface 100. The surface 102 of plate 90 and surface 100 of member 96 defines a space 104 therebetween.

A plurality of arms 106 are secured to the outer end of hub portion 56 as illustrated in FIGS. 2 and 3 to provide a convenient means of threadably rotating the hub portion 56 to move the bearing means inwardly or outwardly with respect to the housing 14 thereby causing the plate 90 to be moved towards or away from surface 100 of member 96. Pipe 108 is secured to the machine by welding or the like and has a rod 110 threadably extending therethrough. The lower end of rod 110 has a brake shoe 112 mounted thereon which is adapted to frictionally engage the surface 60 of hub portion 56 to maintain the hub portion and bearing means in position. The rod 110 may be threadably moved upwardly in pipe 108 to move brake shoe 112 out of frictional engagement with the hub portion 56 when it is desired to threadably move the hub portion 56 with respect to the housing 14.

FIG. 4 illustrates one possible configuration for the discharge end of the shaft or screw conveyor means. A plurality of beater bars 114 are mounted on the discharge end of the screw conveyor means in a spaced apart relationship and are designed to restrict the flow the material thereby so as to create additional agitating and heating of the material. The beater bars are disposed at a 30° angle with respect to the shaft to define a ramp-like configuration. It is preferred that 8 of such bars be provided. FIG. 5 illustrates a still further modified configuration of the screw conveyor means wherein the discharge end of the screw conveyor means is provided with a flighting portion 118 having a much greater lead than the flighting on the remaining portion of the screw conveyor means.

In operation, the material is deposited in the hopper 22 by the auger 24 at a rate which is controlled by the manually operated control valve 28. The material is deposited into the intake end of the housing 14 through the opening 20. The rotation of the shaft 66 by the shaft 84 causes the flighting 88 to convey the material along the length of the housing 14. The material is crushed as it is conveyed from one end of the housing to the other due to the relationship of the flighting 88 and the flutes 52. When the material reaches the discharge end of the housing, the material is forced outwardly through the space 104. The forcing of the material through the small space 104 creates a tremendous pressure to be exerted on the material to the point where the soy beans are substantially liquified by the combination of heat and pressure generated by the intense frictional forces applied thereto at that particular point. The soy bean materials which are being processed are in a fluid state upon reaching the end of the flighting 88. At this time, the soy beans are in small particles if not completely in a liquified form. The material is then passed between the surfaces 100 and 102. The surfaces 100 and 102 will become extremely hot during the operation and the additional heat supplied to the material by the surfaces further aids in heating and cooking the material.

The space 104 is easily adjusted by simply threadably moving the hub portion 56 with respect to the housing 14 as previously described. If it is desired to increase the space 104, the hub portion 56 is simply rotated so as to be moved inwardly with respect to the housing 14 which causes the plate 90 to be moved outwardly with respect to the member 96. When the shaft 66 is properly positioned, the rod 110 is threadably moved so as to cause the frictional engagement of the brake shoe 112 onto the surface 60 which will prevent the hub portion 56 from inadvertently rotating during the operation of the machine. The arms 106 provide a convenient means for selectively threadably rotating the hub portion 56 with respect to the housing.

The pre-load nut 74 provides a convenient means for maintaining the bearings in position and also provides the necessary loading of the same. The sensing means 50 senses the temperature of the material adjacent the discharge end of the housing and provides a visual means to the operator which indicates the temperature of the material being discharged from the machine. The intense heat and pressure applied to the soy bean material as it passes through the housing 14 and outwardly through the space 104 in effect cooks the soy bean material to neutralize the urease activity therein. It can be appreciated that the interior of the housing is easily cleaned by simply removing the nut 78 and the bearing assembly to permit the shaft 66 to be removed from the discharge end of the housing.

It should be noted that the conical shape of plates 89 and 90 provide a minimum area for the material to exert longitudinal thrust on the shaft 66 and thus substantially reduces the wear on bearing means 58.

Thus it can be seen that an extremely efficient machine has been provided for processing soy bean materials or the like. Thus the invention accomplishes at least all of its stated objectives.

I claim:

1. A machine for cooking material, comprising,
   an elongated hollow housing having opposite ends and an interior wall surface,
   a screw conveyor means including a shaft with spiral flighting thereon rotatably mounted in said housing for conveying material along the interior of said housing upon the rotation of said shaft,
   said housing having a material inlet opening adjacent its said one end,
   means for supplying material to said material inlet opening, means extending inwardly from the interior of said housing towards said spiral flighting means, a ring-shaped member secured to the other end of said housing and having a central opening formed therein which has a progressively increasing diameter from the inner to outer ends thereof, a frustum-shaped end member mounted within said central opening of said ring-shaped member, said material being heated and cooked by heat and pressure applied thereto which is generated as the material is conveyed along the interior of said housing and forced outwardly from said housing between said ring-shaped member and said frustum-shaped end member, and wherein said frustum-shaped end member is secured to said shaft, and means is provided on said shaft and said housing for selectively adjusting the longitudinal position of said shaft to adjust the space between said frustum-shaped end member and said central opening of said ring-shaped member.

2. The machine of claim 1 wherein said one end of said housing includes an internally threaded portion, a bearing means threadably secured to said internally threaded portion and being longitudinally movable with respect thereto, said shaft rotatably extending through said bearing means and being longitudinally movable therewith, and means for maintaining said shaft in position with respect to said bearing means.

3. The machine of claim 2 wherein said shaft includes a cylindrical portion having a shoulder means at the inner end thereof, a bearing inner housing mounted on said cylindrical portion and having a shoulder means at its inner end and an externally threaded portion at its outer end, a roller bearing means mounted on said bearing inner housing outwardly of said shoulder means thereon, a pre-load nut threadably mounted on the threaded portion of said bearing inner housing engaging said roller bearing means, a cylindrical hub portion embracing said roller bearing means and being selectively threadably secured to said housing and having inner and outer ends, and means on the outer end of said hub portion for selectively threadably moving said hub portion, roller bearing means and said shaft with respect to said housing whereby the space between said frustum-shaped end member and said central opening of said ring-shaped member may be adjusted.

4. The machine of claim 3 wherein said means on the outer end of said hub portion comprises a plurality of outwardly extending arms.

5. The machine of claim 3 wherein a brake means is secured to the machine which is selectively movable into engagement with said hub portion to prevent rotation of said hub portion with respect to said housing.

6. A machine for cooking material, comprising, an elongated hollow housing having opposite ends and an interior wall surface, a screw conveyor means including a shaft with spiral flighting thereon rotatably mounted in said housing for conveying material along the interior of said housing upon the rotation of said shaft, said housing having a material inlet opening adjacent its said one end, means for supplying material to said material inlet opening, means extending inwardly from the interior of said housing towards said spiral flighting means, a ring-shaped member secured to the other end of said housing and having a central opening formed therein which has a progressively increasing diameter from the inner to outer ends thereof, a frustum-shaped end member mounted within said central opening of said ring-shaped member, said material being heated and cooked by heat and pressure applied thereto which is generated as the material is conveyed along the interior of said housing and forced outwardly from said housing between said ring-shaped member and said frustum-shaped end member, and wherein a plurality of outwardly extending beater bars are secured to said shaft adjacent said frustum-shaped end member.

7. A machine for cooking material, comprising, an elongated hollow housing having opposite ends and an interior wall surface, a screw conveyor means including a shaft with spiral flighting thereon rotatably mounted in said housing for conveying material along the interior of said housing upon the rotation of said shaft, said housing having a material inlet opening adjacent its said one end, means for supplying material to said material inlet opening, means extending inwardly from the interior of said housing towards said spiral flighting means, a ring-shaped member secured to the other end of said housing and having a central opening formed therein which has a progressively increasing diameter from the inner to outer ends thereof, a frustum-shaped end member mounted within said central opening of said ring-shaped member, said material being heated and cooked by heat and pressure applied thereto which is generated as the material is conveyed along the interior of said housing and forced outwardly from said housing between said ring-shaped member and said frustum-shaped end member, and wherein an outwardly extending ramp means is mounted on said shaft adjacent said frustum-shaped end member.

8. A machine for cooking material, comprising, an elongated hollow housing having opposite ends and an interior wall surface, a screw conveyor means including a shaft with spiral flighting thereon rotatably mounted in said housing for conveying material along the interior of said housing upon the rotation of said shaft, said housing having a material inlet opening adjacent its said one end, means for supplying material to said material inlet opening, means extending inwardly from the interior of said housing towards said spiral flighting means, a ring-shaped member secured to the other end of said housing and having a central opening formed therein which has a progressively increasing diameter from the inner to outer ends thereof, a frustum-shaped end member mounted within said central opening of said ring-shaped member, said material being heated and cooked by heat and pressure applied thereto which is generated as the material is conveyed along the interior of said housing and forced outwardly from said housing between said ring-shaped member and said frustum-shaped end member, and wherein said shaft is rotatably mounted in a bearing means adjacent said one end, and said frustum-shaped end member limits and substantially neutralizes the longitudinal thrust imposed on said shaft by pressure of material compressed around said shaft and between said ring-shaped member and said frustum-shaped end member to protect said bearing means against longitudinal movement of said shaft.

9. In a machine for cooking grain, comprising an elongated hollow housing assembly having a longitudinal axis, opposite ends and an interior wall surface;

a screw conveyor means including a shaft assembly extending longitudinally of, and rotatably mounted in said housing assembly, said screw conveyer means including a spiral flighting means for conveying grain along the interior of said housing assembly upon the rotation of said shaft assembly with restricted clearance between said flighting means and said surface;

said housing assembly having grain inlet and discharge openings adjacent its opposite ends;

means for supplying grain to said grain inlet opening;

cooking control means comprising adjustable blocking means for adjustably restricting and adjustably partially blocking said discharge opening, said adjustable blocking means including a first metering surface on said shaft assembly, said first metering surface cooperating with a second metering surface on said housing assembly and defining therewith said discharge opening;

the restrictive action provided by the restricted clearance and blocking means being such that grain is heated and cooked by heat and pressure generated as the grain is conveyed along the interior of said housing assembly, discharged outwardly through said discharge opening and (redirected by) past said blocking means; and said cooking control means operable to selectively adjust the restrictive action provided by said restricted clearance and said blocking means and cause selective regulation of said heating and cooking of said grain;

the improvement wherein at least one of said first and second surfaces is disposed at an acute angle relative to said housing longitudinal axis.

10. In a machine according to claim 9 wherein both of said first and second metering surfaces are disposed at an acute angle relative to said housing longitudinal axis and diverging therefrom in the direction of grain movement.

11. In a machine according to claim 10 wherein said shaft assembly is longitudinally adjustable in said housing assembly to adjust the spacing between said first and second metering surfaces.

* * * * *